United States Patent
Dicostanzo

(10) Patent No.: US 9,420,824 B2
(45) Date of Patent: Aug. 23, 2016

(54) SYSTEM AND METHOD OF ENCODING

(71) Applicant: Patricia Dicostanzo, Seabrook, TX (US)

(72) Inventor: Patricia Dicostanzo, Seabrook, TX (US)

(*) Notice: Subject to any disclaimer, the term of this patent is extended or adjusted under 35 U.S.C. 154(b) by 0 days.

(21) Appl. No.: 14/314,020

(22) Filed: Jun. 24, 2014

(65) Prior Publication Data
US 2015/0366260 A1    Dec. 24, 2015

(51) Int. Cl.
| | |
|---|---|
| *B41F 17/00* | (2006.01) |
| *A23P 1/08* | (2006.01) |
| *A23G 4/02* | (2006.01) |
| *A23L 1/212* | (2006.01) |
| *A23G 3/34* | (2006.01) |
| *A23G 4/18* | (2006.01) |

(52) U.S. Cl.
CPC .......... *A23P 1/086* (2013.01); *A23G 3/0097* (2013.01); *A23G 4/025* (2013.01); *A23G 4/18* (2013.01); *A23L 1/212* (2013.01); *A23L 1/2123* (2013.01); *A23P 2001/089* (2013.01); *A23V 2002/00* (2013.01)

(58) Field of Classification Search
CPC ........................................ A23P 1/086
USPC ........................................ 101/373
See application file for complete search history.

(56) References Cited

U.S. PATENT DOCUMENTS

| | | | |
|---|---|---|---|
| 272,443 A | 2/1883 | Ingersoll | |
| 842,690 A * | 1/1907 | Oswalt | 101/373 |
| 2,370,925 A * | 3/1945 | Wade | A01J 19/00 249/104 |
| 2,682,118 A | 6/1954 | Larsen | |
| 3,843,133 A | 10/1974 | Brown et al. | |
| 4,187,772 A * | 2/1980 | Hollenbeck | B41K 1/28 101/109 |
| 4,344,626 A * | 8/1982 | Wadland | A63F 3/0423 273/243 |
| 4,397,871 A | 8/1983 | Meyer et al. | |
| 6,267,997 B1 * | 7/2001 | Ream et al. | 426/3 |
| 6,406,733 B1 * | 6/2002 | Willcocks et al. | 426/515 |
| 6,506,425 B2 * | 1/2003 | Gustafsson | 426/5 |
| 6,596,328 B1 * | 7/2003 | Bezek | B65D 1/165 206/497 |
| 2003/0215549 A1 * | 11/2003 | Coleman | A23G 3/563 426/115 |
| 2011/0014373 A1 * | 1/2011 | Perry | 427/256 |

* cited by examiner

*Primary Examiner* — Anthony Nguyen
(74) *Attorney, Agent, or Firm* — Delphine James

(57) ABSTRACT

The present invention is a tool and method for imprinting encoded messages on a food product. The tool comprises an imprinting device that engages with the opening of a container that holds the food product. The imprinting device has a geometric configuration with at least 5 flat planes. The imprinting device functions as a lid of the container. Each of the flat plane contain the following symbols: a long line, a shorter liner, a large half-circle, and a shorter half-circle, and a small circle designating a period The method of the system involves creating each number and alphabet in the English language utilizing five designated symbols incorporated on each plane of the cube.

11 Claims, 18 Drawing Sheets

Figure 2

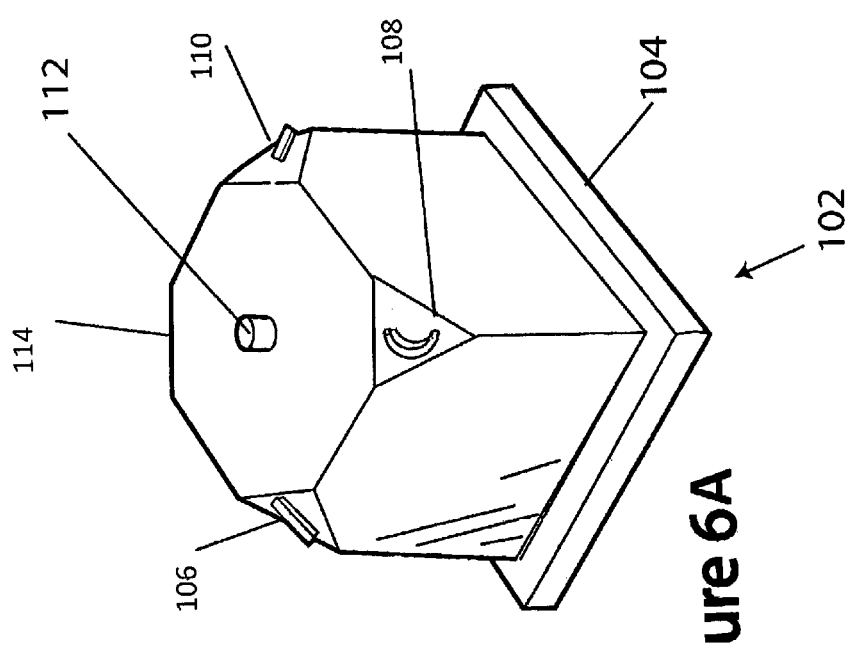

Figure 12A

SYSTEM AND METHOD OF ENCODING

This patent is a continuation in part of patent application Ser. No. 12/082,895 and continuation of application Ser. No. 13/850,263 and Ser. No. 14/138,047.

BACKGROUND

The present invention relates to encoding systems. More specifically, the present invention relates to a method, system and tool for imprinting messages onto food products provided within a kit. There are many standardized coding systems such as ASCII that encodes the 26 alphabets and 10 numbers. However, many of these systems have translations with elaborate mapping systems. However, the present invention provides a simple and efficient method and device for translating the twenty six alphabets and ten numbers from five symbols.

SUMMARY

One of the advantages of the present invention is that it is a compact and efficient encoding system that is edible. Another advantage is the ability to create each number and symbol in the English language from 5 designated symbols.

Another advantage is that it enables children to create, pass, and eat either explicit or encoded messages.

The present invention is a tool and method for imprinting encoded messages on a food product. Preferably the food can be gum, rice, fruit or vegetable product. The tool further comprises an imprinting cube with designated encoded symbols incorporated on each plane of a geometrical shape imprinting tool with at least five planes. In the present invention a cube is the preferred geometrical shape. The device further comprises a container for holding a plurality of food products. The imprinting tool has a one face of its geometrical shape that engages with the opening of the container. Thus, the imprinting tool also functions as a lid. The method comprises utilizing each designated symbol on the face of the imprinting tool to encode a message on the food product. The method is a system of creating each number and alphabet in the English language utilizing five designated symbols incorporated on each plane of the imprinting tool.

BRIEF DESCRIPTION OF DRAWINGS

FIG. 2 shows a sample of an acronym dictionary that can be utilized with the present invention.

FIG. 6A shows an alternative embodiment of the imprinting cube showing figures A, B, C, D, and E.

FIG. 12A shows the twenty six alphabet letters of the present invention.

DETAILED SPECIFICATIONS

The detailed embodiment of the present invention is disclosed herein. The disclosed embodiment is not to be interpreted as limited, but merely as a basis for teaching one skilled in the art to make and/or use the present invention.

Figure 1:
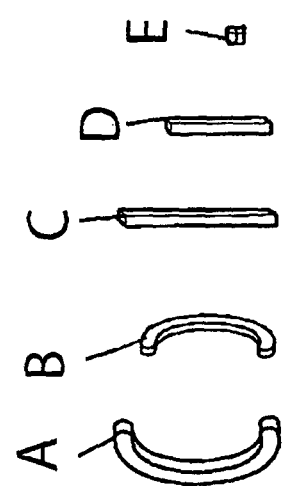
FIG. 1 illustrates the five symbols of the encoding system of the present invention.
Figure 12:
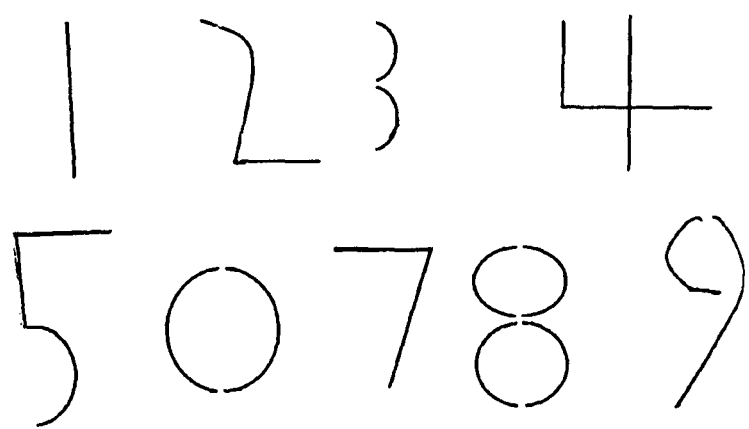
FIG. 12 shows the ten number symbols of the present invention.

The symbols comprising the unique encoding system of the present invention are disclosed in FIG. 1. The system comprises symbol C designating a longer line, symbol D designating a shorter line in relation to symbol C, symbol A designating a large semi-circle or half-circle, symbol B designating a small semi-circle or half-circle in relation to symbol A and symbol E designating a solid small circle for a period used at the end of a sentence in the English Language. Each of the symbols will be incorporated onto a plane of the imprinting tool as described below. The symbols depicted in FIG. 1 are to support the creation of the 26 alphabets and 10 numbers illustrated in FIG. 2. Each character in the alphabets and numbers can be created through the interconnection of the symbols illustrated in FIG. 1 as shown in FIG. 12 which depicts the numbers and FIG. 12A which depicts the alphabets.

Figure 2:
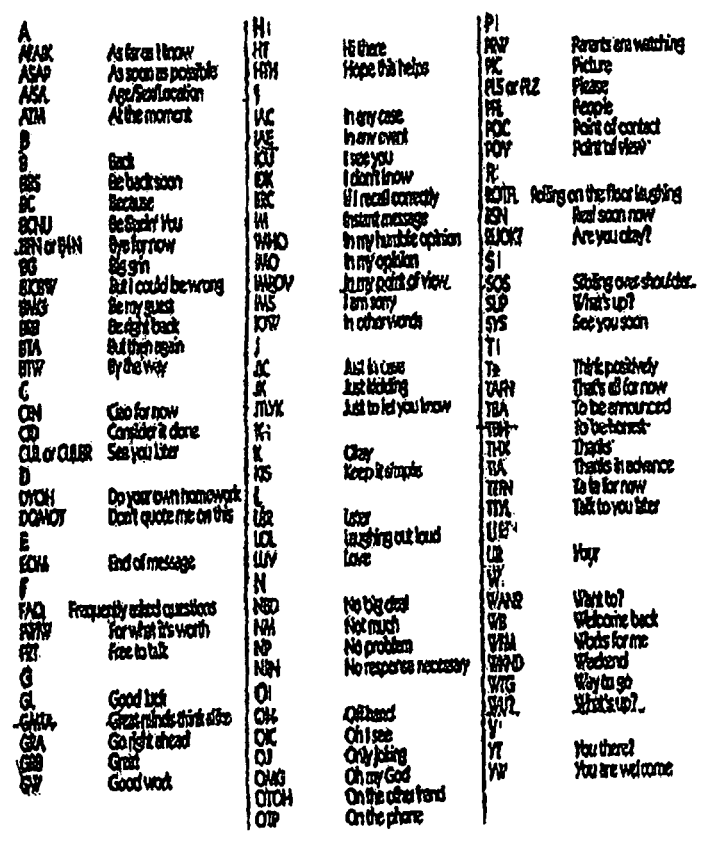
Figure 12A:
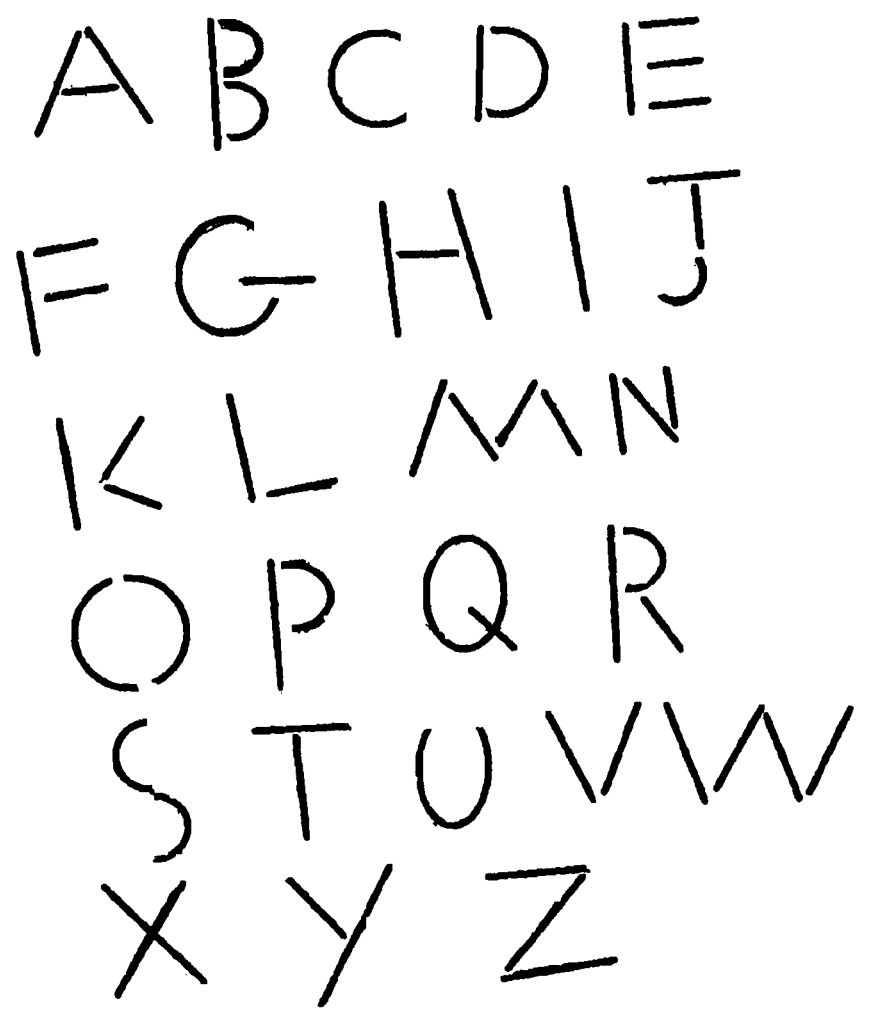

FIG. 2 illustrates how the symbols can be interconnected to create the 26 alphabets along with pre-determined encoded messages. FIG. 2 is a sample mapping chart that can be used by a user to create an encoded message using device (10). Each of the symbols in FIG. 1 are interconnected as depicted in FIG. 12 and FIG. 12A to create each of the 26 alphabets and 10 numbers respectively. The mapping chart in FIG. 2 also provides some sample messages that can be used by the user to create short encoded messages. In addition, the symbols shown in FIG. 1 of the present invention can also be utilized to create shapes if the user so desires. The system also can be created with a sample acronym system of short messages of the English language which is illustrated in FIG. 2. However, the symbols of the present invention can be used with any language that incorporates the same 26 alphabets and 10 numbers.

The afore mentioned encoding system can be implemented on various types of imprinting devices as shown in FIG. 4 and FIGS. 6-10. Additionally, these imprinting devices can be made of acrylic, wood, foam, or another suitable hard or soft type of plastic material.

Figure 4:
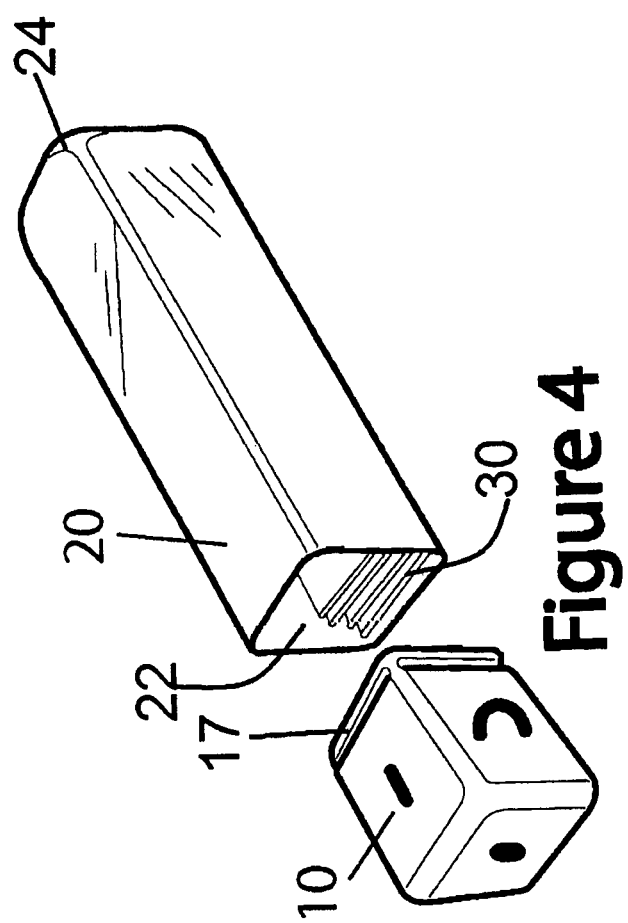
FIG. 4 shows the acronym system implemented one type of embodiment of the imprinting device.

Referring to FIG. 4, in the illustrated embodiment, the imprinting device (10) is made from a geometric structure having at least five flat planes. A calibration line (18) can be incorporated within one plane to allow the user to form messages in a straight line as shown in FIG. 4. Each encoding symbol illustrated in FIG. 1 can be recessed inwardly into the flat plane as shown in FIG. 4. Alternatively, the encoding system can protrude outwardly.

Figure 11:
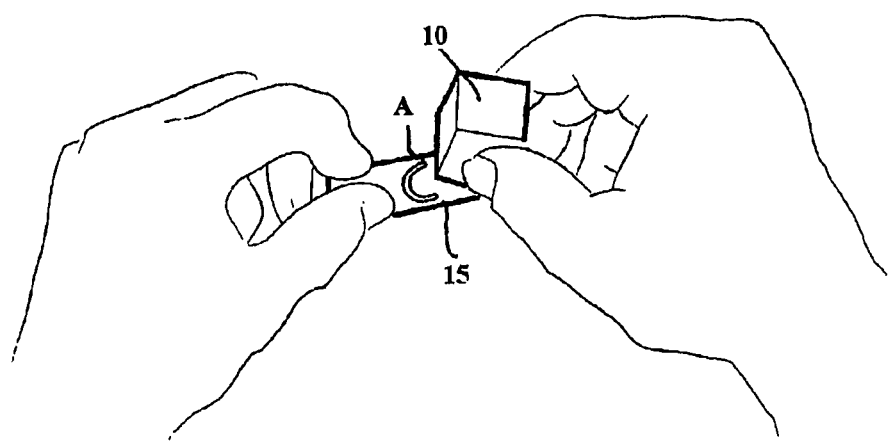
FIG. 11 shows the user in action of imprinting using one of the imprinting cubes of the present invention.

In the embodiment shown in FIG. 11 the imprinting device is preferably made from a geometric polyhedron with at least five flat planes. A calibration line (18) can be incorporated within one plane to allow the user to form messages in a straight line as shown in FIG. 4. Each encoding symbol illustrated in FIG. 1 can be recessed inwardly into the flat plane or protrude outwardly from the flat plane as shown in FIG. 4.

FIG. 4, illustrates one embodiment of the imprinting device of the present invention. In this embodiment a six sided cube is illustrated with one side that can be engaged within the opening of the container. As shown in FIGS. 6, 7, 8, 9, and 10 the imprinting device (10) can be alternative geometric shapes. As illustrated each shape has an edge (17) that engages with the opening of a container (20) that stores the food product (15).

The imprinting device in FIG. 4 includes a cube (10) and container (20). Imprinting cube (10) and container (20) can be made of plastic, acrylic, or another suitable material. In the preferred embodiment, imprinting cube (10) is made of a transparent or translucent material. As shown the container (20) contains a bottom wall (24) with surrounding walls that extend upwards to an opening (22). The surrounding walls have a length and width to support the food product (30) shown in FIG. 5. In the embodiment in FIG. 4, the container (20) has an elongated rectangular compartment to receive the food product (15). Side (17) of imprinting cube (10) show in in FIG. 4 is configured to engage with opening (22) of container (20).

Figure 4A:
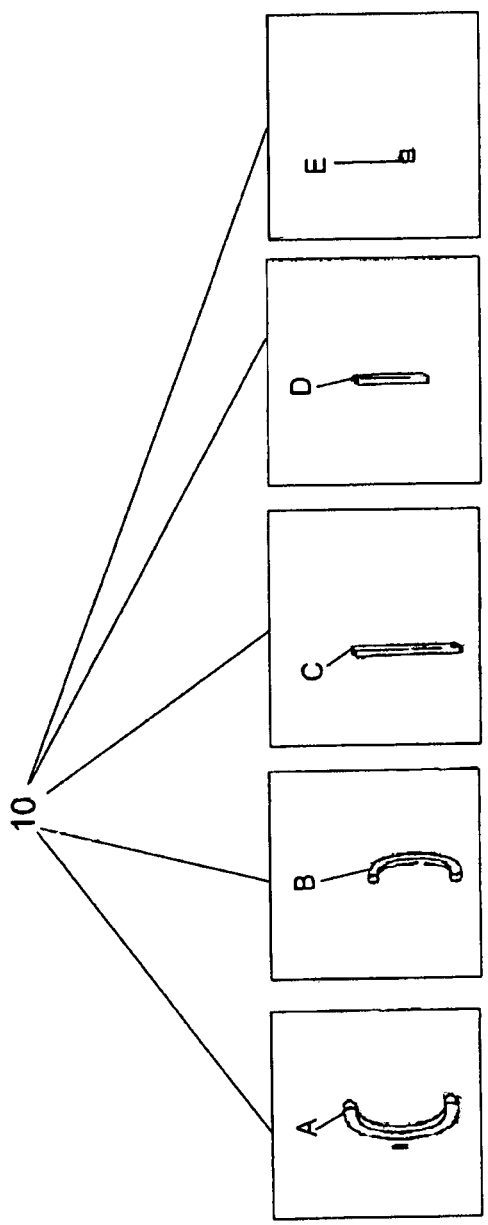
FIG. 4A shows the imprinting cubes for the five symbols of the encoding system of the present invention.

Imprinting cube (10) in FIG. 4 is a solid three dimensional geometric figure bounded by 6 planes. Each of the six sides is a flat plane square containing a specific symbol illustrated in FIG. 1. Each symbol of FIG. 1 (i.e. A, B, C, D and E) is incorporated into the external surface of each plane and protrudes slightly outward as shown in FIG. 4. FIG. 4A illustrates each plane with a corresponding symbol from FIG. 1 incorporated therein.

Container (20) depicted in FIG. 4 is a three dimensional geometric figure bounded by six planes. Four sides of container (20) form a rectangular configuration with a cavity having a length and a width to hold the food product (15) illustrated in FIG. 5. However, as illustrated in FIG. 4 the opened top side and the opposing bottom side of container (20) has a square configuration corresponding to a flat plane of cube 10. The top side (22) of container 20 is opened which allows for a plurality of food products (30) to be inserted into the container 20. The opening of container 20 is squared and engages with a square plane of imprinting cube (10). The top side (22) of container (20) is opened which allows for a plurality of food products (30) to be inserted into the container (20). The opening of container (20) is square and engages with a square plane of imprinting cube (10). As depicted the imprinting cube has edge (17) which engages with the top side (22) of container (20) to form a lid that holds the food product (30) within container (20).

Figure 3:
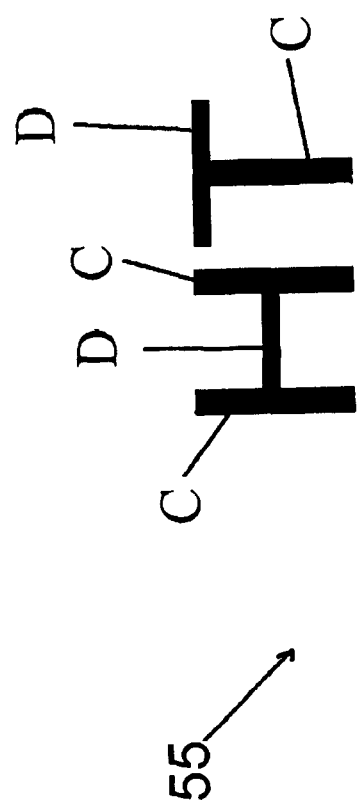
FIG. 3 shows the implementation of the symbols used to create a message.
Figure 5:
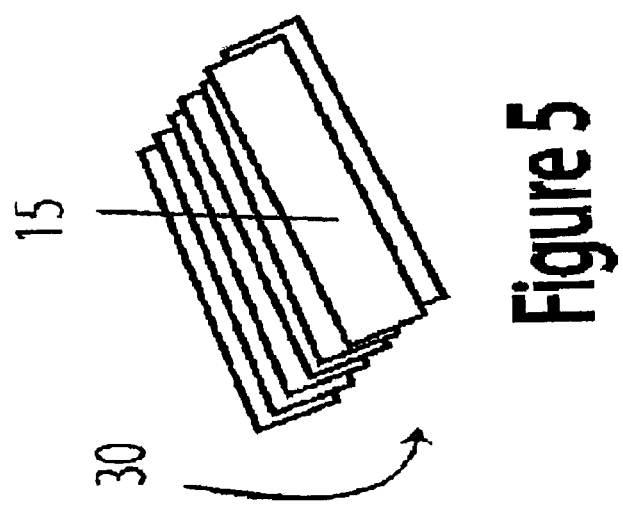
FIG. 5 shows the flattened food product placed in the canister of the present invention.
Figure 5A:
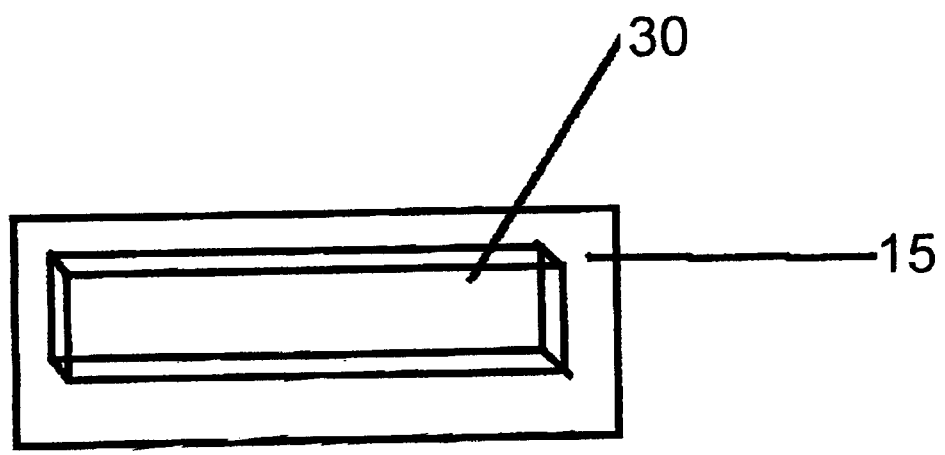
FIG. 5A illustrates the gum lying on the covering.

The present invention further comprises a plurality of food products (30) as shown in FIG. 5. Each food product (30) is flat and rectangular with a length and width dimensioned to fit within container (20) depicted in FIG. 4. A covering (15) surrounds each food product (30) as shown in FIG. 5A. In use, the user removes the imprinting device (10) from the opening (22) of the container (20) and uses it to create an encrypted message (55) as shown in FIG. 3 upon covering (15) as shown in FIG. 11. In the preferred embodiment, the covering (15) can be made of a form of flat flexible plastic or edible rice paper. If covering (15) is edible the entire food product becomes edible. In the preferred embodiment, each food product (30) can be made of gum, fruit, vegetable or another suitable flexible food product that can be flattened and stored within covering (15) as depicted in FIG. 5A As shown in FIG. 11, the present invention further comprises a method utilizing tool (10) for encoding a message onto food product (15). In the illustrated embodiment in FIGS. 4 and 4A, each plane of imprinting cube (10) contains one of the following symbols designated as A, B, C, D, and E illustrated in FIG. 1. Symbol A is a big half-circle, Symbol B is a short half-circle, symbol C is a long line, symbol D is a shorter line, and symbol E is a period.

Imprinting cube (10) is used to create the each of the alphabets and numbers as depicted in FIG. 2. FIGS. 12 and 12A illustrates the interconnectivity of the symbols in FIG. 1 to create respectively the 26 alphabets and 10 numbers in the English Language. As a specific example to create the letter "D", symbol C and A would be used wherein a longer line is joined with the big half-circle to form the letter D. To create, the letter "C" only symbol A would be used. The method involves the user determining its message and then finding each appropriate symbol illustrated in FIG. 1 to create the alphabets and numbers shown in FIG. 2. on the cube and then pushes that side of the cube onto the covering of the food product. The present invention further provides the ability of users to use a special acronym dictionary as depicted in FIG. 2. For example as shown in FIG. 3, HT (55) can be imprinted as an acronym to send a message of Hi There as shown in FIG. 2. To create the letter H, two vertical lines (symbol C) with one horizontal line (symbol D) extending across the middle are imprinted. To create the letter T, one long vertical line (symbol C) is imprinted with a shorter horizontal line (symbol D) perpendicularly across the top edge of the vertical line.

Additionally, the tool can be equipped with a sanitizer to prevent the spread of germs between users. Additionally, the imprinting cube (10) can be adapted with interchangeable side planes. This allows the symbols illustrated in FIG. 1 on the imprinting cube (10) to be exchanged out. As shown in FIG. 4B, each side of imprinting cube (10) has fasteners at each corner to hold plane (11) in place once inserted.

Figure 6:
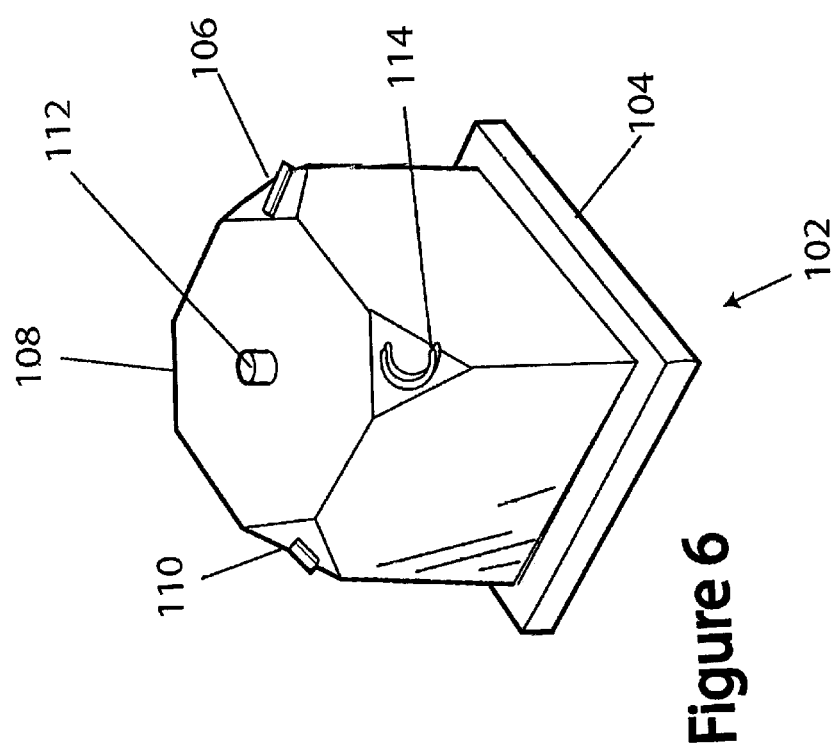
FIG. 6 shows an alternative embodiment for the imprinting device.
Figure 7:
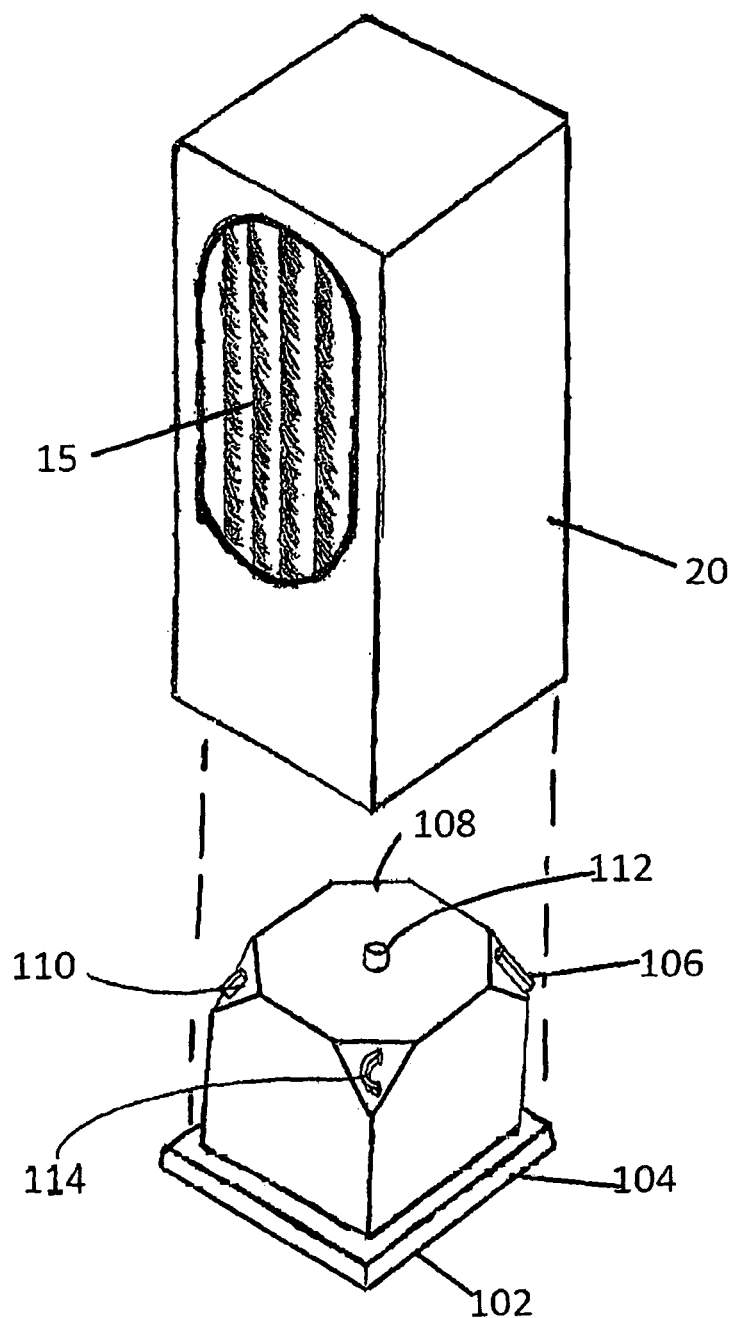
FIG. 7 shows the alternative embodiment of FIG. 6 inserted into a canister.

As shown in FIG. 6, the encoding symbols in FIG. 1 of the present invention can be incorporated into an alternative cube design. As depicted cube (102), the top plane of the cube (10) is configured with each of the four corners flattened and surrounding the top plane. The lower flat plane is fixably coupled to a support base (104). Each corner of the top plane is collapsed into a flat plane. As depicted in FIGS. 6 and 6A each symbol in FIG. 1 can be incorporated upon each collapsed flat plane (110) designates D, (108) designates B, (106) designates C, (112) designates E and (114) designates A. As shown in FIG. 7, cube (102) can also be configured to slidably engage within canister (20) with food products (30) contained therein.

Figure 8:
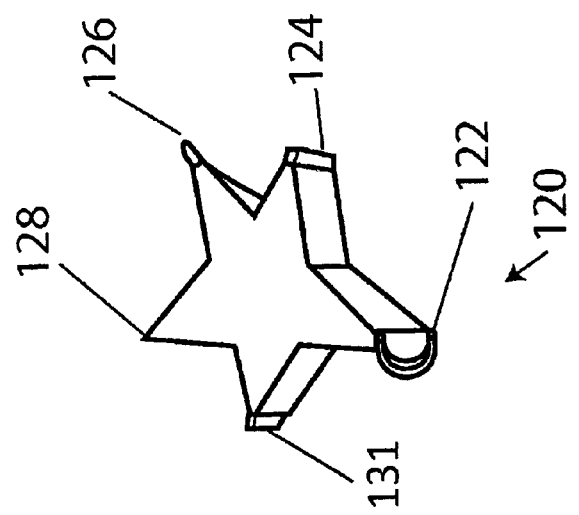
FIG. 8 shows an alternative embodiment for the imprinting device with a star configuration.

Referring to FIG. 8, there is shown an alternative embodiment, for the imprinting device, a star (120). In this configuration, each apex point of the star is collapsed into a flat plane to allow a symbol to be incorporated thereon. As depicted, each encoded symbol from FIG. 1 is incorporated into each flat plane (i.e. (128) designates symbol B, (131) designates D, (122) designates A, (126) designates E, and (124) designates C). An edge of imprinting tool (120) can be configured to engage with a container (20) that is not shown.

Figure 9:
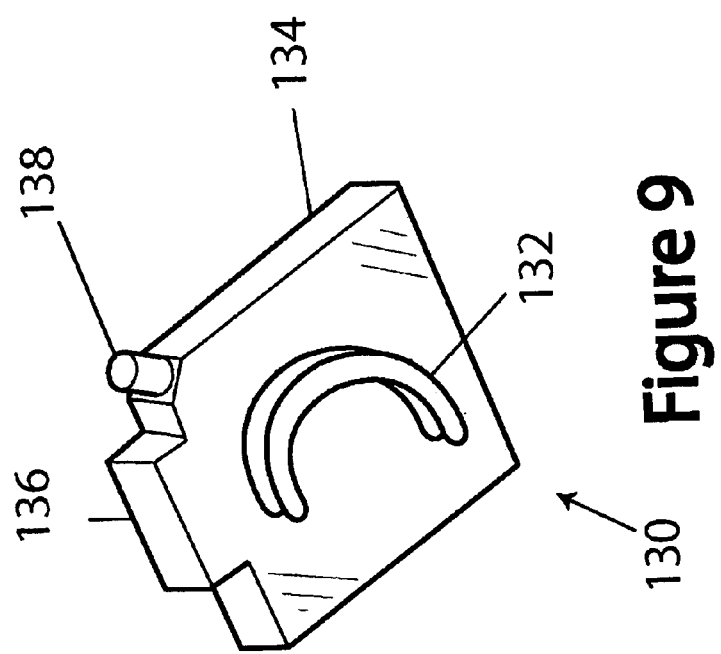
FIG. 9 shows an alternative embodiment for the imprinted device with a substantially rectangular configuration.
Figure 9A:
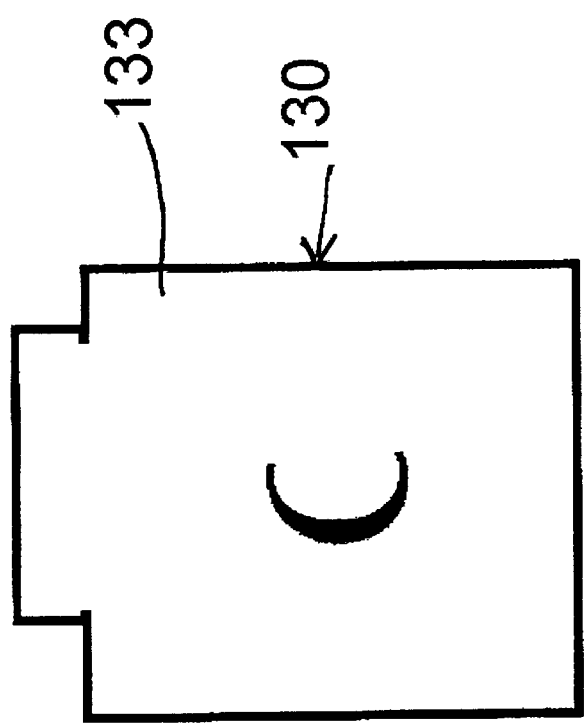
FIG. 9A shows a side view of the rectangular configuration.

Referring to FIGS. 9 and 9A, there is shown an alternative embodiment for the imprinting device, a substantially rectangular polyhedron (130). In this configuration, the front and back plane incorporates the short and large semi-circle symbols A (132) and B (133) respectively from FIG. 1. The upper edge is adapted with a shorter side to accommodate the smaller line designated as symbol D (136). One side edge is adapted with the longer line, symbol C. Circle (138) can be adapted protruding outward from the upper edge or can be adapted upon another side edge and designates symbol E (134). An edge of imprinting tool (130) can be configured to engage with a container (20) that is not shown.

Figure 10:
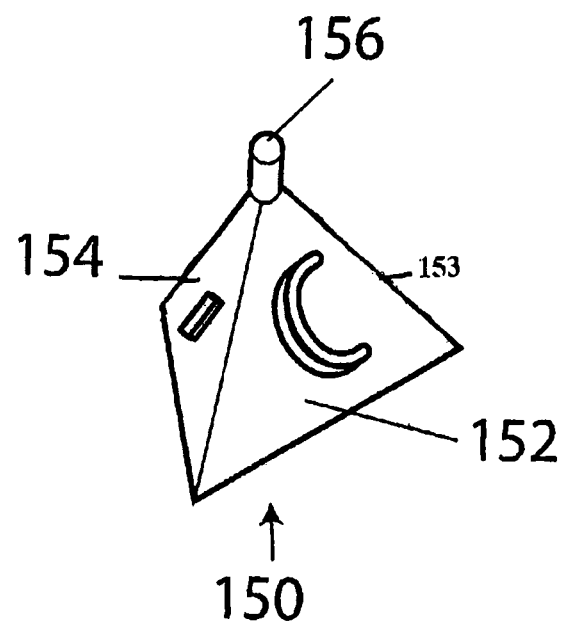
FIG. 10 shows an alternative embodiment for the imprinting device with a solid triangular configuration.
Figure 10A:
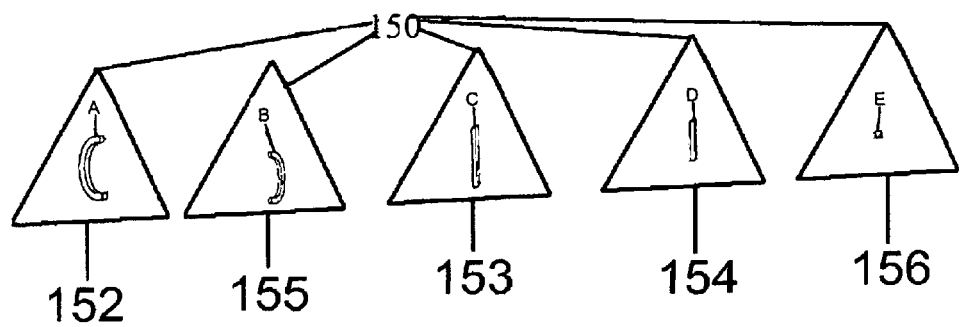
FIG. 10A shows the triangles illustrating the five symbols of the present invention.

Referring to FIGS. 10 and 10A, there is shown an alternative embodiment for the imprinting device, a triangular solid geometric figure (150). As depicted each symbol (A designated as (152), B designated as (155), C designated as (153), D designated as (154), and E designated as (156)) are incorporated into a flat plane side of the triangle. The solid circle (156) protrudes outward from the apex point to designate symbol E. An edge of imprinting device (150) can be configured to engage with the top side of a container (20) not shown.

What is claimed is:

1. A device used in combination with an edible food product for creating an encoded message from a group consisting of 26 alphabets and 10 numbers thereon, the device comprising:
    a container having a bottom wall with surrounding sidewalls defining an inner compartment and extending upward to an opened top end;
    the inner compartment extending a pre-defined length and width to receive at least one of the edible food products therein;
    an imprinting mechanism having a polyhedron geometric structure with at least 6 flat polygonal faces that forms vertices thereon;
    an encoding member incorporated on each of the plurality of polygonal faces of the imprinting mechanism;
    the imprinting mechanism having one flat face configured to engage with the opened top end of the container to form a lid thereon;
    the pre-defined length and width of the container configured to receive the food product therein;
    the edible food product having a flat surface defined by a length and a width configured to seat within the inner compartment;
    the inner compartment configured to receive a plurality of edible food products therein;
    a covering encompassing the flat surface of each edible food product wherein a writing surface is formed thereon; and
    at least one of the encoding member selects from the group consisting of a long line, a short line, a large half circle, a shorter half circle, and a period, and a blank incorporated upon wherein a user can create the encoded message on the writing surface of the covering of the edible food product.

2. The device of claim 1 wherein the covering is made of rice.

3. The device of claim 1 where in the covering is made of paper.

4. The device of claim 1 wherein the edible food product is a gum.

5. The device of claim 1 wherein the food product is made from a fruit product.

6. The device claim 1 wherein the food product is made from a vegetable product.

7. The device of claim 1 wherein the container is rectangular in shape with an elongated compartment extending from the bottom wall to the top end with dimensioned to receive the edible food product therein.

8. The device of claim 2 wherein the geometric structure is a cube polyhedron with a plurality of flat face with an encoding member encoded upon each planar face.

9. The device of claim 2 wherein the geometric structure is a star with the encoding members incorporated upon each apex point of the star.

10. The device of claim 2 wherein the geometric further comprises:
    a cube having a bottom plane and a top flat plane with four corners;
    the bottom plain mounted upon a base having a width large than the cube;
    each of the four corners flatted wherein an encoding member can be incorporated thereon; and an encoding member incorporated upon a face.

11. A method of encoding a message consisting of characters from a group of twenty six alphabets and 10 numerals from the English language, the method comprising:
    (a) providing the device of claim 1;
    (b) removing the imprinting mechanism from the container;
    (c) removing a food product from the container;
    (d) determining a first sequence of characters to combine to create the message; and
    (e) determining a second sequence of encoding members to combine to create each character in the first sequence;
    (f) imprinting the second sequence upon the food product wherein the first sequence forms the message upon the food product.

* * * * *